(12) United States Patent
Fujino

(10) Patent No.: US 6,609,045 B1
(45) Date of Patent: Aug. 19, 2003

(54) FILE CONVERSION APPARATUS FOR MACHINING PROGRAM OF NUMERICAL CONTROL SYSTEM AND COMPUTER READABLE RECORDING MEDIUM FOR STORING PROGRAM FOR COMPUTER TO EXECUTE FILE CONVERSION PROCESS

(75) Inventor: Daisuke Fujino, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/424,117

(22) PCT Filed: Jan. 28, 1999

(86) PCT No.: PCT/JP98/02344
§ 371 (c)(1),
(2), (4) Date: Nov. 19, 1999

(87) PCT Pub. No.: WO99/61962
PCT Pub. Date: Dec. 2, 1999

(51) Int. Cl.[7] .............................................. G06F 19/00
(52) U.S. Cl. .................... 700/189; 700/181; 700/159
(58) Field of Search ................................. 700/159–195, 700/98, 118

(56) References Cited

U.S. PATENT DOCUMENTS

| 5,227,978 | A | | 7/1993 | Kato ........................... 700/189 |
|---|---|---|---|---|
| 5,390,292 | A | * | 2/1995 | Takamura et al. .......... 345/420 |
| 5,548,698 | A | * | 8/1996 | Smith et al. ................. 345/660 |
| 5,723,961 | A | * | 3/1998 | Fujino et al. ........... 318/568.15 |
| 5,726,896 | A | * | 3/1998 | Jia et al. ...................... 700/187 |
| 6,044,309 | A | * | 3/2000 | Honda .......................... 700/187 |

FOREIGN PATENT DOCUMENTS

| DE | A-41-36843 | 5/1992 |
|---|---|---|
| DE | 196 18 332 A1 | 1/1997 |
| EP | 0 706 103 A1 | 4/1996 |
| JP | A-63-149705 | 6/1988 |
| JP | A-1-152507 | 6/1989 |
| JP | A-4-52805 | 2/1992 |
| JP | A-4-175905 | 6/1992 |
| JP | HEI 5-165514 | 7/1993 |
| JP | A-5-324426 | 12/1993 |
| JP | HEI 6-138928 | 5/1994 |
| JP | HEI 7-44218 | 2/1995 |
| JP | HEI 7-64620 | 3/1995 |
| JP | HEI 7-282117 | 10/1995 |
| JP | HEI 8-50504 | 2/1996 |
| JP | A-08-305430 | 11/1996 |
| JP | HEI 9-26813 | 1/1997 |
| JP | A-09-114512 | 5/1997 |
| WO | WO96/35980 | 11/1996 |

OTHER PUBLICATIONS

Dr.–Ing. A. Potthast und Dipl.–Math. B. Oder, Berlin. German Review: "ZwF"(1990) 8, ps. 421–426.
German review: "wt–Z. ind. Fertig." 76 (1986), ps. 309–312.
Fuji Yamaguchi, et al, "Shape Processing Engineering (I)", Oct. 30, 1982, pp. 162–169.

* cited by examiner

*Primary Examiner*—Leo Picard
*Assistant Examiner*—Ryan Jarrett
(74) *Attorney, Agent, or Firm*—Sughrue Mion, PLLC

(57) ABSTRACT

A machining program for a NC machine tool including a NURBS interpolation command is input as a source file, the input machining program is sequentially analyzed in such a way that the portions other than the NURBS interpolation command portion are left as they are, and the NURBS interpolation command portion is converted into a minuscule line segment interpolation command, a spline interpolation command or a NURBS interpolation command of a differently presented specification by the conversion unit. In accordance with the conversion mode selectively set by a conversion mode setting unit, the portions other than the NURBS interpolation command portion are left as they are, while the NURBS interpolation command portion is converted into a minuscule line segment interpolation command, a spline interpolation command or a NURBS interpolation command of a differently presented specification thereby to generate destination file.

12 Claims, 15 Drawing Sheets

FIG.4
(a)
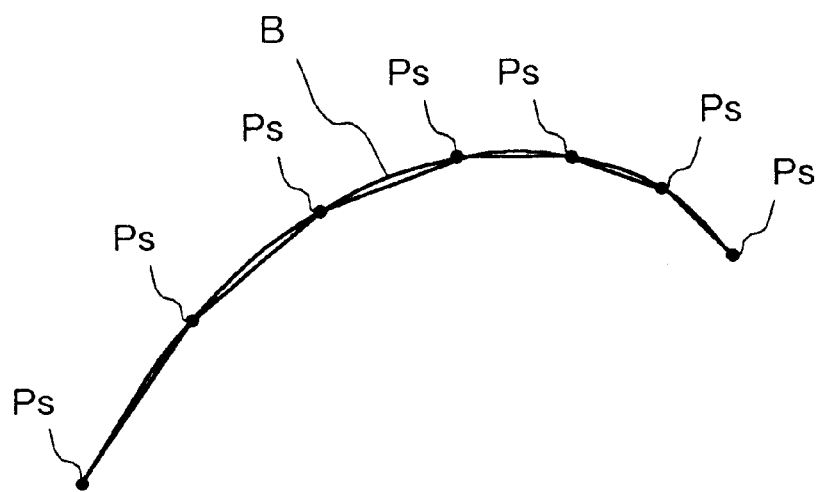
(b)
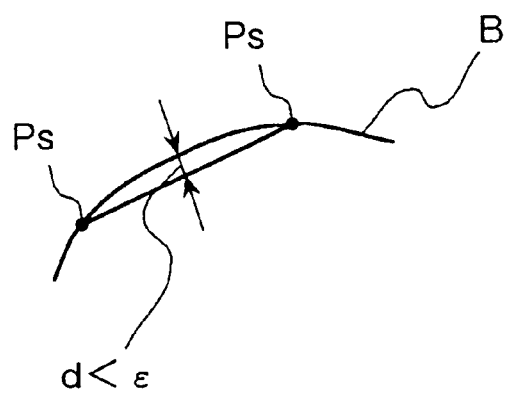

FIG.12
(a)
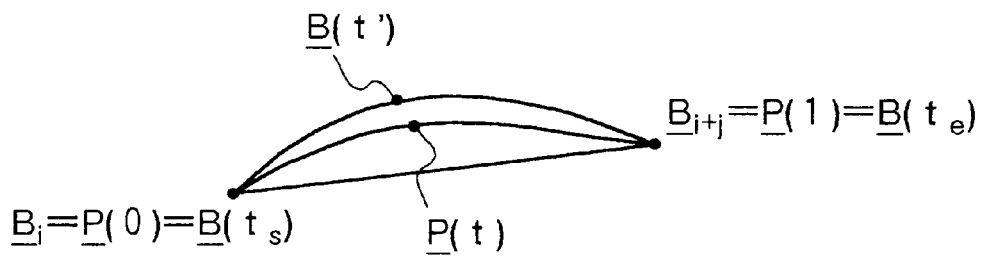
(b)
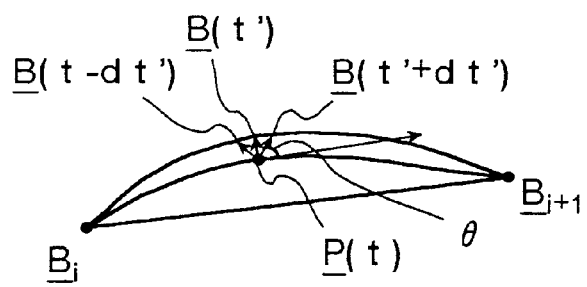
(c)
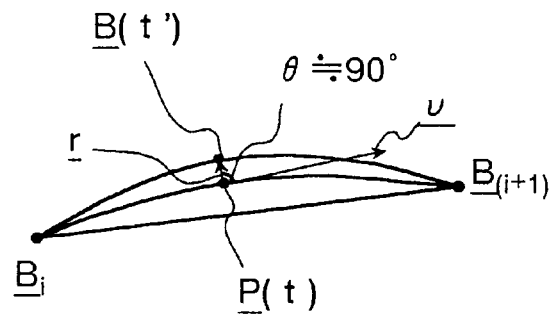

FIG.17
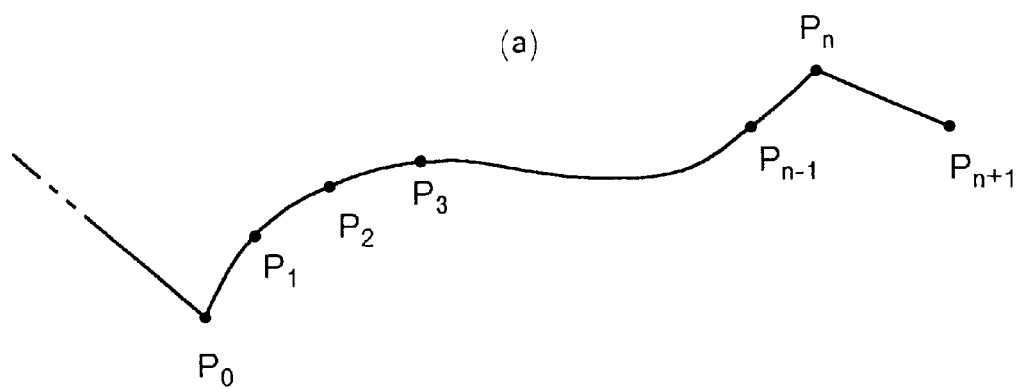
(a)
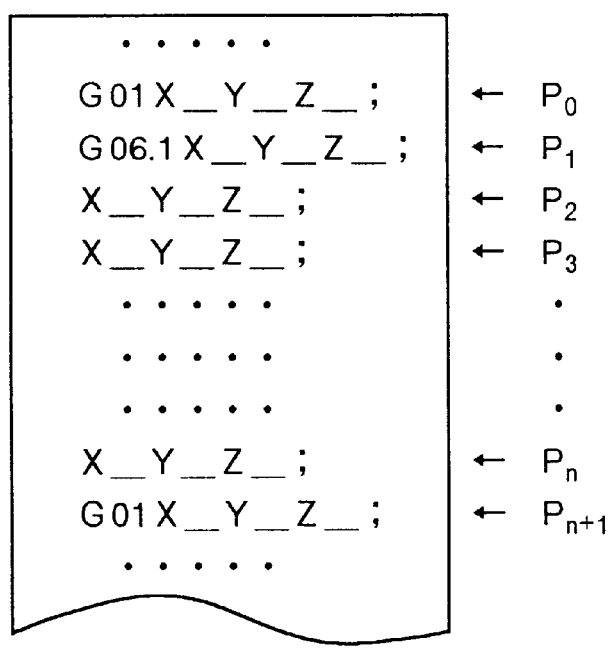
(b)

FILE CONVERSION APPARATUS FOR MACHINING PROGRAM OF NUMERICAL CONTROL SYSTEM AND COMPUTER READABLE RECORDING MEDIUM FOR STORING PROGRAM FOR COMPUTER TO EXECUTE FILE CONVERSION PROCESS

TECHNICAL FIELD

The present invention relates to a file conversion apparatus for a machining program for a numerical control system and a computer readable recording medium for storing a program for the computer to execute the file conversion process. More particularly this invention relates to a file conversion apparatus for a machining program including a NURBS interpolation command and a computer readable recording medium for storing a program for the computer to execute the file conversion process.

BACKGROUND ART

In a numerical control system, basic commands for designating the machine travel route include a linear interpolation command (G01) and an arcuate interpolation command (G02, G03).

For designating a travel route corresponding to a free curved shape, a curve is approximated with minuscule line segments and a command is issued according to linear interpolation. In such a linear interpolation of minuscule line segments, a string of points on the curve are connected by straight lines for interpolation. Depending on the accuracy of approximating the curve by minuscule line segments, therefore, the machine travel route may lose the smoothness in the boundary between minuscule line segments.

In view of this, the method of generation of a smooth curved interpolation trace by passing through a string of points formed by spline interpolation instead of by linear interpolation has already been employed in some fields.

FIGS. 17(a) and (b) show about a spline interpolation and a command program. In this program, the G code for designating a spline are described. Then, the coordinates of a series of the passing points are described so that the numerical control system controls the machine travel through a smooth designated route passing through the designated string of points.

In FIGS. 17(a) and (b), the machine travels up to a point $P_0$ by linear interpolation according to a command code G01, and then the spline interpolation mode with a command code G06.1 is entered, followed by designating the coordinate values of the passing points $P_1, P_2, \ldots, P_n$. In this way, the machine is controlled to travel along a smooth curve passing through the points $P_1, P_2, \ldots, P_n$.

A technique has also been proposed in which a part of the curve is not approximated by minuscule line segments but directly by an arithmetic definition of the curve. This curve definition is directly read by the numerical control system so that the machine travel route is controlled by the curve interpolation. For the curve definition in this case, the NURBS (Non Uniform Rational B-Spline) having a high freedom of curve expression has been proposed.

FIG. 14 shows a command format according to a program for NURBS interpolation described in Japanese Patent Application Laid-Open Publication No. HEI 4-175905. In this command format, the number of steps of NURBS is designated by address M following the code G70.0, the number of control points of NURBS by address N, the knot vector by address K following the code 70.0, the (X, Y, Z) coordinate of each control point by addresses X, Y, Z following G70.1, and the weight of each control point by address W.

Figure 15:
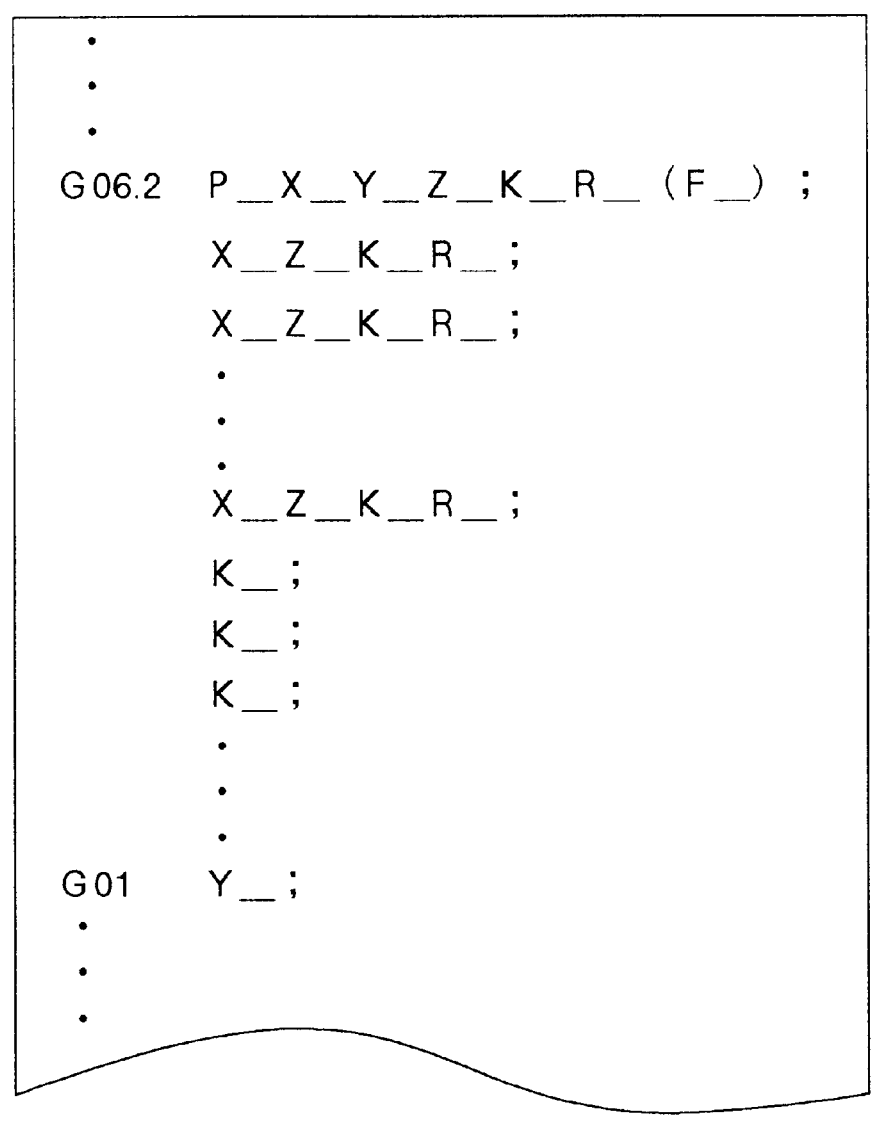

FIG. 15 shows a command format according to the program for NURBS interpolation described the above mentioned publication HEI 8-305430. In this command format, the number of steps of NURBS is designated by address P following code G06.2, the knot vector by address K, the (X, Y, Z) coordinate of control points by addresses X, Y, Z, and the weight of each control point by address R.

In any way, the NURBS curve can be uniquely defined by designating the number of steps and the coordinates and the weight of each control point.

In a NC machine tool having the NURBS interpolation function, the machining program including the NURBS interpolation command described in the format described above is directly read and the distance covered along the NURBS curve is distributively controlled at servo interpolation periods thereby to carry out the NURBS interpolation.

The NC machine tool having the NURBS interpolation function, however, has yet to find wide applications, and such a function, if any, is offered as an expensive option.

Further, the NURBS interpolation command lacks a standard format, and different NC system makers employ different formats.

Therefore, there is disadvantage that only a small proportion of specified machines can actually carry out the machining work using a machining program output in a format including the NURBS interpolation command designed according to NURBS having a high degree of shape design freedom.

Another problem is that the machining program prepared in the NURBS interpolation command format of a given company cannot be used for the machining work on the NC machine tool of another company.

The present invention has been developed in view of the problems described above, and the object thereof is to provide a file conversion apparatus in which a machining program including the NURBS interpolation command described in a given format is converted into a machining program having a code system or a format usable with a NC machine tool not equipped with the NURBS interpolation function but supports the linear interpolation, the spline interpolation or the NURBS interpolation command of a different format, and a computer readable recording medium for storing a program for the computer to execute the file conversion process.

DISCLOSURE OF THE INVENTION

According to the present invention, there is provided a computer-operated file conversion apparatus for converting a source file constituting a machining program for a numerical control system including the NURBS interpolation command into a destination file, comprising a conversion unit for inputting the machining program as the source file, sequentially analyzing the input machining program, and leaving portions other than the NURBS interpolation command as they are and converting the NURBS interpolation command into a minuscule line segment interpolation command, wherein the destination file is generated by leaving portions other than the NURBS interpolation command as they are by the conversion unit and converting the NURBS interpolation command into a minuscule line segment interpolation command.

As a result, the NURBS interpolation command of a machining program for a numerical control system including the NURBS interpolation command is converted into a minuscule line segment interpolation command, and an ordinary machining program including no NURBS interpolation command is obtained as a destination file.

Further, according to the present invention, there is provided a computer-operated file conversion apparatus for converting a source file constituting a machining program including the NURBS interpolation command for a numerical control system into a destination file, comprising a conversion unit for inputting the machining program as the source file, sequentially analyzing the input machining program, and leaving portions other than the NURBS interpolation command portion as they are and converting the NURBS interpolation command portion into a spline interpolation command, wherein the destination file is produced by leaving portions other than the NURBS interpolation command as they are and converting the NURBS interpolation command into the spline interpolation command by the conversion unit.

As a result, the NURBS interpolation command of a machining program for a numerical control system including the NURBS interpolation command is converted into the spline interpolation command thereby to produce an ordinary machining program not including any NURBS interpolation command as a destination file.

Further, according to the present invention, there is provided a computer-operated file conversion apparatus for a machining program for a numerical control system, comprising a unit for converting the NURBS interpolation command into a spline interpolation command, wherein a string of points is generated by polygonal approximation in such a manner as to secure a chord error from the NURBS curve within a tolerance, a spline curve passing through the point string is generated, the error between the line segment in each section between the passing points and the spline curve is evaluated in order to check whether the error is within a tolerance or not, and if the error exceeds the tolerance then a passing point is added in the corresponding section to reconstruct the point string, and the point string thus reconstructed is used as a passing point string for the spline interpolation command.

Thus, a point string is constructed with the error kept less than the tolerance between the line segment in each section between the passing points and the spline curve, thereby producing a smooth spline curve.

Further, according to the present invention, there is provided a file conversion apparatus for a machining program for a numerical control system, in which when a passing point is added while constructing a string of passing points of a spline curve from the NURBS curve, a spline curve passing a reconstructed point string is generated from the reconstructed point string, the error between the line segment in each section between the passing points and the spline curve is evaluated in order to check whether the error is within a tolerance or not, and when the error exceeds the tolerance then a passing point is added in the particular section thereby to reconstruct the point string, the process being repeated until there are no new passing points to be added.

As a result, a point string is constructed in which the error between each line segment between the passing points and the spline curve is within a tolerance so that a smooth spline curve is obtained over a wide area.

Further, according to the present invention, there is provided a computer-operated file conversion apparatus for converting a source file constituting a machining program for a numerically controlled machine tool including the NURBS interpolation command into a destination file, comprising a conversion unit for inputting the machining program as the source file, sequentially analyzing the input machining program, and leaving portions other than the NURBS interpolation command as they are and converting the NURBS interpolation command into a NURBS interpolation command of a differently presented specification, wherein the destination file is generated by leaving portions other than the NURBS interpolation command as they are and converting the NURBS interpolation command into a NURBS interpolation command of a differently presented specification.

As a result, the NURBS interpolation command for a machining program for a numerical control system including the NURBS interpolation command is converted into a NURBS interpolation command of a differently presented specification, thereby producing a machining program based on the NURBS interpolation command of a differently presented specification as a destination file.

Further, according to the present invention, there is provided a computer-operated file conversion apparatus for converting a source file constituting a machining program for a numerically controlled machine tool including the NURBS interpolation command into a destination file, comprising a conversion unit for inputting the machining program as the source file, sequentially analyzing the input machining program, and leaving portions other than the NURBS interpolation command as they are and converting the NURBS interpolation command into a minuscule line segment interpolation command; a the conversion unit for leaving portions other than the NURBS interpolation command as they are and converting the NURBS interpolation command into a spline interpolation command; a the conversion unit for leaving portions other than the NURBS interpolation command as they are and converting the NURBS interpolation command into a NURBS interpolation command of a differently presented specification; and a conversion mode setting unit for selectively setting any one of the aforementioned three conversion units, wherein a destination file is generated by leaving portions other than the NURBS interpolation command as they are and converting the NURBS interpolation command into a minuscule line segment command, a spline interpolation command or a NURBS interpolation command of a differently presented specification in accordance with the conversion mode selectively set by the conversion mode setting unit.

As a result, the conversion mode can be selectively set by the conversion mode setting unit, and in accordance with the conversion mode selectively set, the NURBS interpolation command is converted into a minuscule line segment interpolation command or a spline interpolation command, and an ordinary machining program not containing the NURBS interpolation command or the NURBS interpolation command is converted into a NURBS interpolation command of a differently presented specification as a destination file, thus producing a machining program based on the NURBS interpolation command of a differently presented specification as a destination file.

Further, according to the present invention, there is provided a computer-readable recording medium for storing a program for the computer to execute a step of inputting a machining program for a numerical control system including the NURBS interpolation command as a source file; a the step of sequentially analyzing the input machining program; a the step of leaving portions other than the NURBS command portion as they are and converting the NURBS interpolation command into a minuscule line segment interpolation command; and a step of writing into the destination file the data obtained by leaving portions other than the NURBS interpolation command portion as they are and converting the NURBS interpolation command into the minuscule line segment interpolation command.

As a result, the program stored in the recording medium can be executed on a computer, so that the NURBS interpolation command of the machining program for a numerical control system including the NURBS interpolation command is converted into a minuscule line segment interpolation command, thereby producing an ordinary machining program not including the NURBS interpolation command as a destination file.

Further, according to the present invention, there is provided a computer-readable recording medium for storing a program for the computer to execute a step of inputting a machining program for a numerical control system including the NURBS interpolation command as a source file; a step of sequentially analyzing the input machining program; a step of leaving portions other than the NURBS command portion as they are and converting the NURBS interpolation command into a spline interpolation command; and a step of writing into the destination file the data obtained by leaving portions other than the NURBS interpolation command portion as they are and converting the NURBS interpolation command into the spline interpolation command.

As a result, the program stored in the recording medium is executed by the computer, so that the NURBS interpolation command of a machining program for a numerical control system including the NURBS interpolation command is converted into a spline interpolation command, thereby producing an ordinary machining program not including the NURBS interpolation command as a destination file.

Further, according to the present invention, there is provided a computer-readable recording medium for storing a program for the computer to execute a step of converting the NURBS interpolation command into a spline interpolation command, comprising substeps of generating a string of points with the help of polygonal approximation to secure the chord error from the NURBS curve within a tolerance, generating a spline curve passing through the particular point string, and evaluating in order to check whether the error between the line segment in each section of the passing points and the spline curve is within a tolerance or not, and reconstructing a point string by adding a passing point in the corresponding section if the error exceeds the tolerance, and using the reconstructed point string a string of passing points for the spline interpolation command.

As a result, the program stored in the recording medium can be executed on a computer so that a point string having an error not more than a tolerance between the line segment in each section between passing points and the spline curve is constructed thereby to produce a smooth spline curve.

Further, according to the present invention, there is provided a computer-readable recording medium for storing a program for the computer to execute a step of constructing a string of points for a spline curve from the NURBS curve, comprising substeps of, when a passing point is added, regenerating a spline curve passing through the reconstructed point string from the particular point string, evaluating in order to check whether the error between the line segment in each section between the passing points and the tertiary spline curve is within a tolerance or not, and reconstructing the point string by adding a passing point in the corresponding section if the error exceeds the tolerance, the whole process being repeated until there is no new passing point to be added.

As a result, the program stored in the recording medium can be executed on a computer, so that a point string is constructed with the error not more than a tolerance between the line segment in each section between the passing points and the spline curve, thereby producing a smooth spline curve over a wide area.

Further, according to the present invention, there is provided a computer-readable recording medium for storing a program for the computer to execute a step of inputting a machining program for a numerical control system including the NURBS interpolation command as a source file; a step of sequentially analyzing the input machining program; a step of leaving portions other than the NURBS command portion as they are and converting the NURBS interpolation command into a spline interpolation command; a step of leaving portions other than the NURBS interpolation command portion as they are and converting the NURBS interpolation command portion into a NURBS interpolation command of a differently presented specification; and a step of writing into a destination file the data obtained by leaving portions other than the NURBS interpolation portion as they are and converting the NURBS interpolation command into a NURBS interpolation command of a differently presented specification.

As a result, the program stored in the recording medium can be executed on a computer so that the NURBS interpolation command for a machining program for a numerical control system including the NURBS interpolation command is converted into a NURBS interpolation command of a differently presented specification thereby to produce a machining program based on the NURBS interpolation command of a differently presented specification as a destination file.

Further, according to the present invention, there is provided a computer-readable recording medium for storing a program for the computer to execute a step of inputting a machining program for a numerically controlled machine tool including the NURBS interpolation command as a source file; a step of sequentially analyzing the input machining program; a step of leaving portions other than the NURBS command portion as they are and converting the NURBS interpolation command into a minuscule line segment interpolation command; a step of leaving portions other than the NURBS interpolation command portion as they are and converting the NURBS interpolation command portion into a spline interpolation command; a step of leaving portions other than the NURBS interpolation command portion as they are and converting the NURBS interpolation command portion into a NURBS interpolation command of a differently presented specification; a conversion mode setting step of selectively setting any one of the aforementioned three conversion steps, and a step of writing into the destination file the data obtained by leaving portions other than the NURBS interpolation portion as they are and converting the NURBS interpolation command into a minuscule line segment interpolation command, a spline interpolation command or a NURBS interpolation command of a differently presented specification in accordance with the conversion mode selectively set by the conversion mode setting step.

As a result, the program stored in the recording medium can be executed on a computer so that the conversion mode can be selectively set by the conversion mode setting step, and in accordance with the selectively set conversion mode, the NURBS interpolation command portion is converted into a minuscule line segment interpolation command or a spline interpolation command, and an ordinary machining program not including the NURBS interpolation command or the NURBS interpolation command is converted into a NURBS interpolation command of a differently presented specification as a destination file thereby to produce a machining program based on the NURBS interpolation command of a differently presented specification as a destination file.

BRIEF DESCRIPTION OF THE DRAWINGS

FIGS. 12(a) to (c) are diagrams for explaining the manner of determining a point on the NURBS curve corresponding to a point on the spline curve, FIG. 14 is a list showing an example format of the NURBS interpolation command, FIG. 15 is a list showing another format of the NURBS interpolation command, FIG. 16 is a list showing the form of the text data in the case where the NURBS interpolation command of FIG. 14 is converted into the format of FIG. 15, and FIGS. 17(a), (b) are diagrams for explaining the spline interpolation.

BEST MODE FOR CARRYING OUT THE INVENTION

A preferred embodiment of the present invention will be explained with reference to the accompanying drawings.

Figure 1:
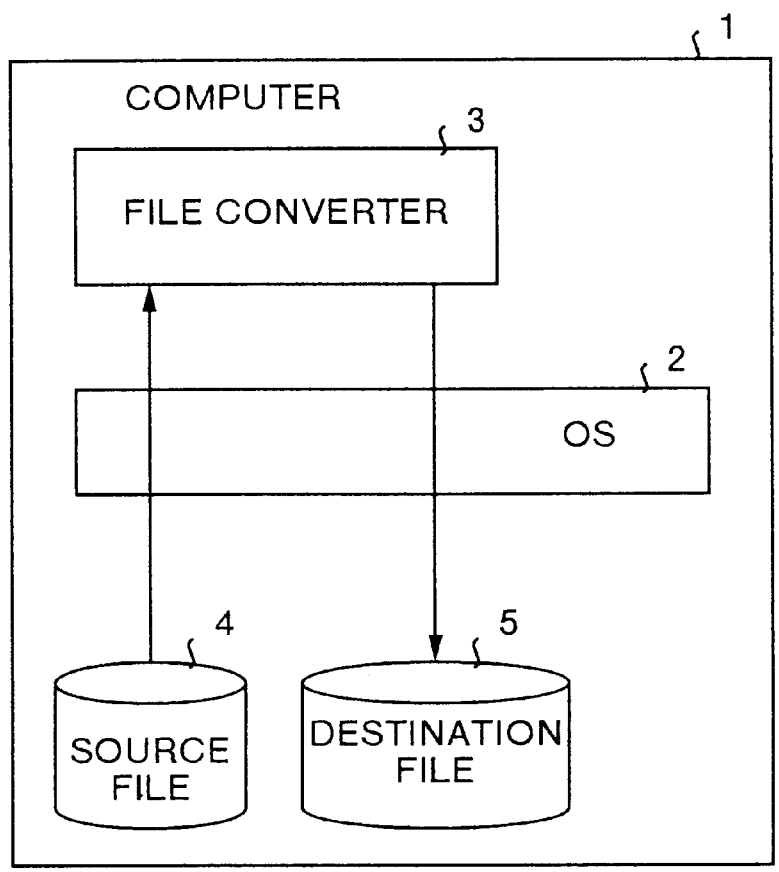
FIG. 1 is a configuration diagram showing an embodiment of a file conversion apparatus according to the present invention.

FIG. 1 shows a configuration of an embodiment of a file conversion apparatus for a machining program for a numerical control system according to the present invention.

In FIG. 1, 1 designates an ordinary computer such as the personal computer. An operating system (OS) is installed in this computer 1.

A file converter 3 is an application program operated on the operating system 2 of the computer 1. This file converter 3 is actually stored in a hard disk magnetic memory, a floppy disk magnetic memory, an IC memory or the like external recording medium that can be read by the computer 1. As a result, the computer 1 operates as a file conversion apparatus for a machining program for a numerical control system.

The file converter 3 reads a program file (hereinafter referred to as the source file) 4 describing the machining specification to be input, converts it into a designated code system or a designated format, and outputs a converted file (hereinafter referred to as the destination file) 5.

The source file 4 is a machining program including the NURBS interpolation command described according to a given format and can be produced by a CAD/CAM unit or the like.

The file converter 3 is for converting the machining program, i.e. the source file 4 into a machining program of a code system and a format usable by a NC machine tool having no NURBS function but that supports the linear interpolation, the spline interpolation or a NURBS interpolation command having a different format.

The file converter 3 sequentially analyzes the source file (machining program) 4 input thereto, and leaves the portions other than the NURBS interpolation command portion as they are and converts the NURBS interpolation command into a minuscule line segment interpolation command, a spline interpolation command or a NURBS interpolation command of a different format thereby to generate a destination file 5.

The source file 4 and the destination file 5 are provided in a hard disk magnetic memory, a floppy disk magnetic memory, an IC memory or other external recording media.

The source file 4 and the destination file 5 are not necessarily stored in the computer 1, but can be stored in an external computer adapted to exchange signals with the computer 1 through a network or the like.

Figure 2:
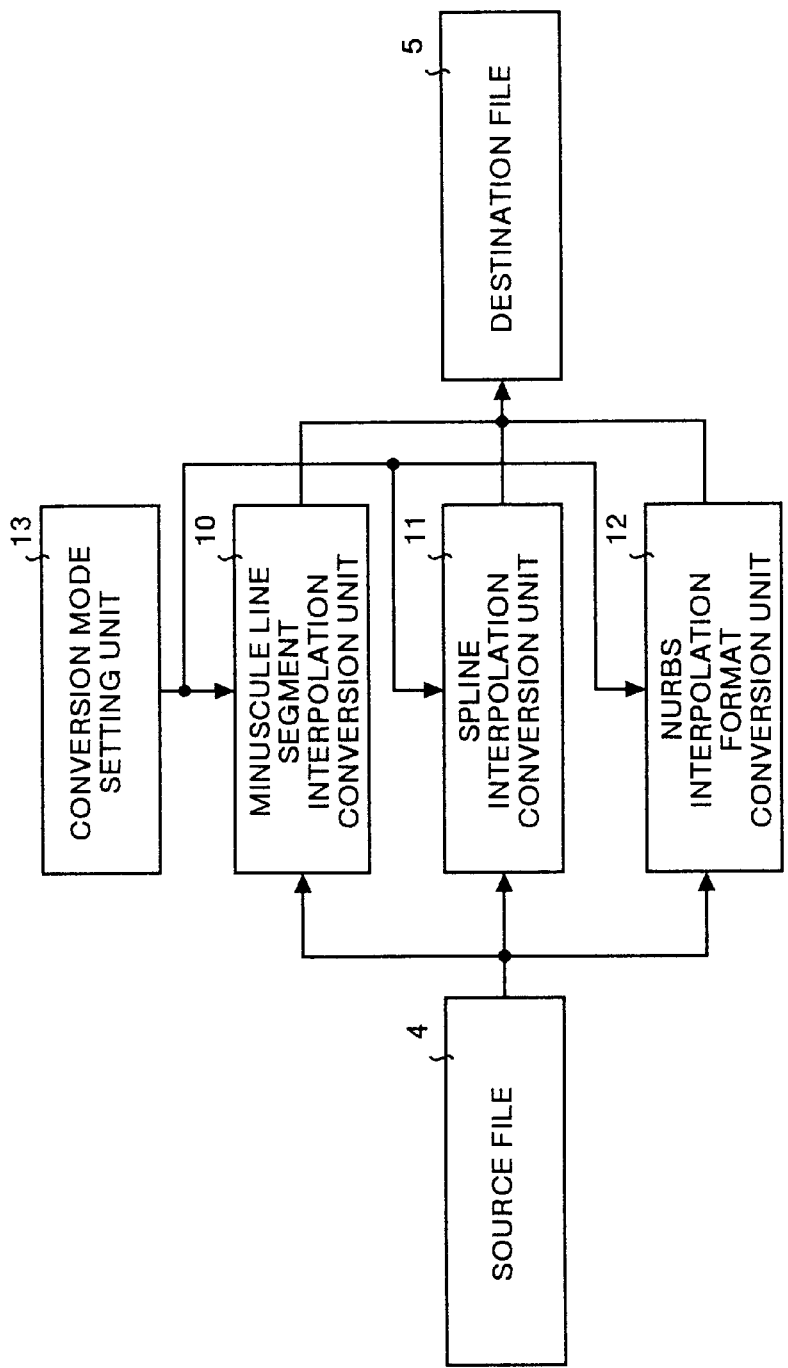
FIG. 2 is a block diagram showing an embodiment of a file conversion apparatus according to the present invention.

FIG. 2 shows a detailed configuration of a file conversion apparatus for a machining program for a numerical control system according to the present invention.

This file conversion apparatus comprises minuscule line segment interpolation conversion unit 10 supplied with a machining program for a NC machine tool including the NURBS interpolation command as a source file 4 for sequentially analyzing the input machining program while leaving portions other than the NURBS interpolation command portion as they are and converting the NURBS interpolation command portion into a minuscule line segment interpolation command, a spline interpolation conversion unit 11 for leaving portions other than the NURBS interpolation command portion as they are and converting the NURBS interpolation command portion into a spline interpolation command, a NURBS interpolation format conversion unit 12 for leaving portions other than the NURBS interpolation command portion as they are and converting the NURBS interpolation command portion into a NURBS interpolation command of a differently presented specification (format), and a conversion mode setting unit 13 for selectively setting a conversion unit out of the three conversion units 10, 11 and 12 described above.

The spline interpolation conversion unit 11 converts the NURBS interpolation command into a spline interpolation command by generating a set of points with the help of a polygonal approximation in such a manner that the chord error from the NURBS curve is within a tolerance. Then, the spline interpolation conversion unit 11 generates a spline curve passing through these set of points and evaluates the error between the line segment in each section between the passing points and the spline curve in order to check whether the error is within a tolerance or not. When the error exceeds the tolerance, a passing point is added in the particular section thereby to reconstruct the set of points, so that the set of points thus reconstructed is used as a set of passing points for the spline interpolation command.

In the case where a passing point is added when constructing a set of passing points of the spline curve from the NURBS curve, the spline interpolation conversion unit 11 regenerates a spline curve passing through these set of points from the reconstructed point string. Then, the spline interpolation conversion unit 11 evaluates the error in order to check whether the error between the line segment in each section between the passing points and the spline curve is within a tolerance or not. When the error exceeds the tolerance the spline interpolation conversion unit 11 reconstructs a set of points by adding a passing point in this particular section. This process is repeated until it becomes unnecessary to add new passing points.

The conversion mode setting unit 13 in an actual case selectively sets a conversion unit based on the one selected by the user with the help of an input unit such as a keyboard or a mouse on the conversion mode setting screen of the computer.

In accordance with the conversion mode selectively set by the conversion mode setting unit 13, the file conversion apparatus leaves the portions other than the NURBS interpolation command portion as they are and converting the NURBS interpolation command portion into a minuscule line segment interpolation command, a spline interpolation command or a NURBS interpolation command of a differently presented specification, and writes the data thus converted into the destination file 5.

The file conversion apparatus may have only one of the three the conversion units 10, 11 and 12. In this case the conversion mode setting unit 13 is not required.

Figure 3:
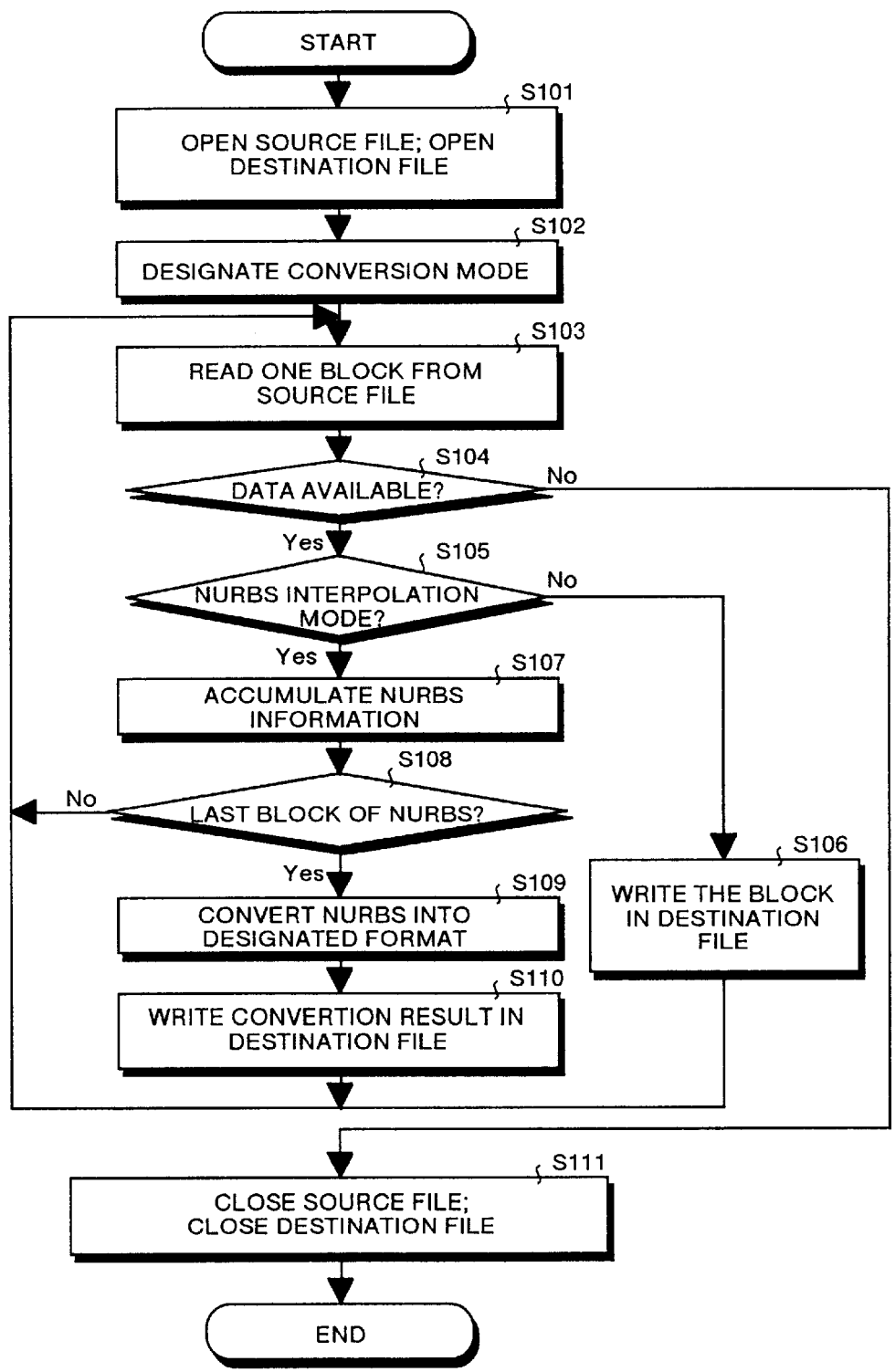
FIG. 3 is a flowchart showing the file conversion process for the file conversion apparatus according to the present invention, FIGS. 4(a), (b) are diagrams for explaining an approximation based on a polygonal curve.

Now, the processing sequence performed by the file converter 3 will be explained with reference to FIG. 3.

To start with, a program file describing the machining specification is opened as a source file 4, and then the destination file 5 into which the file conversion result is to be written is opened (step S101). At this time, the destination file 5 is empty.

Then, the mode of conversion of the NURBS interpolation command is designated by the conversion mode setting unit 13 (step S102).

There are prepared three conversion modes including:
(a) conversion from the NURBS interpolation command into a minuscule line segment interpolation command;
(b) conversion from the NURBS interpolation command into a spline interpolation command; or
(c) conversion from the NURBS interpolation command into another NURBS interpolation command of a different format.

A user can select one of (a) to (c).

When (a) is selected, the chord error $\epsilon$ after the conversion is set. When (b) is selected, a chord error $\epsilon$ and a tolerable error $\delta$ between the NURBS curve and the spline curve after conversion are set. When (c) is selected, on the other hand, the NURBS format after conversion is designated.

One block is read from the source file (step S103). When this block contains data (affirmative in step S104), then it is checked whether NURBS interpolation mode has been set for this block or not (step S105).

When in NURBS interpolation mode is not set for this block (negative in step S105), i.e. in the case where it is in G01 (linear interpolation) or G02, or G03 (arcuate interpolation) mode or other mode than the NURBS interpolation mode, the one block that has been read is directly written in the destination file (step S106), and then the process is looped back to step S103 for reading the next block.

When in NURBS interpolation mode has been set for a block (affirmative in step S105), on the other hand, the various information defining the NURBS curve described in the block are accumulated in memory (step S107). Until the block constitutes the last information of a given NURBS curve, the process is looped back from step S108 to step S103 thereby to accumulate various information in memory.

Figure 14:
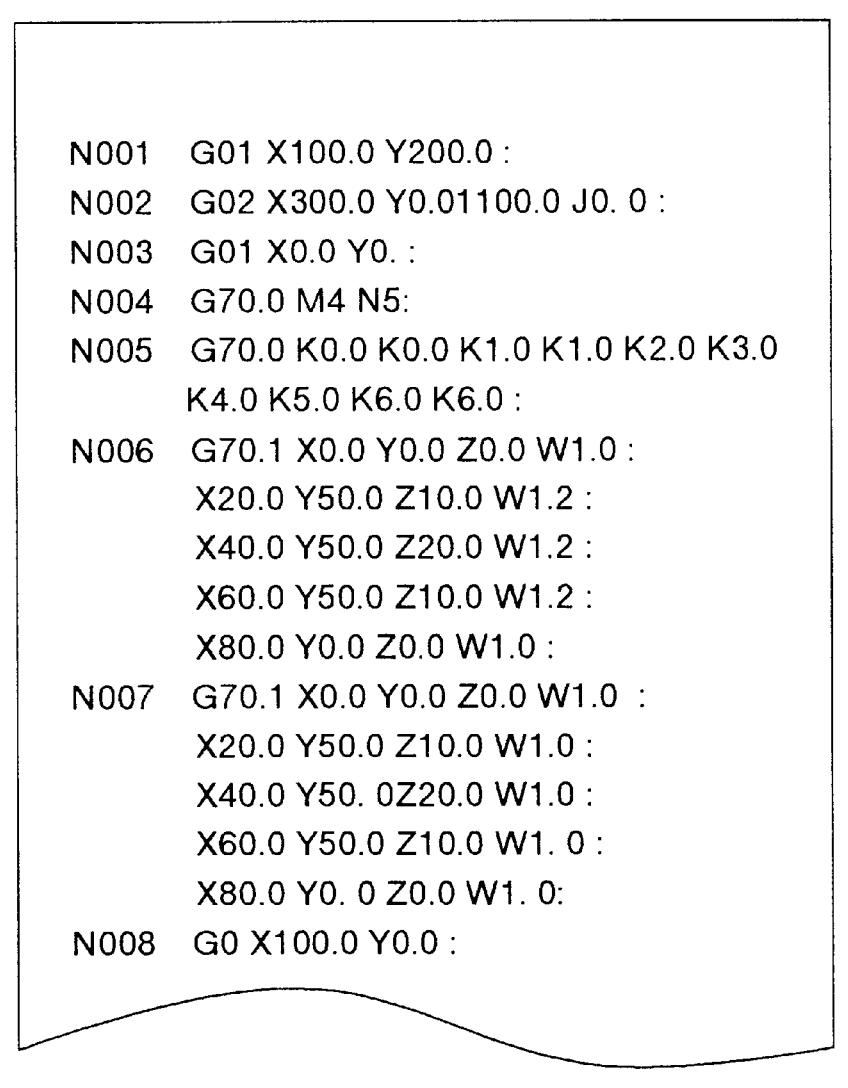

In the source file illustrated in FIG. 14, for example, due to the description G70.0 for block N004, it is determined in step S105 that the NURBS interpolation mode is prevailing. In step S107, the information on the number of steps indicated by the address M and the number of control points indicated by the address N are fetched in memory.

Subsequently, with the NURBS interpolation mode prevailing, the knot vector information is fetched in memory from the block N005, and the information on the coordinates of the control points and the weight are fetched in memory from the N006 and subsequent blocks in the processing loop of steps S103, S104, S105, S107, S108 to S103.

At the time point when the information on the control points corresponding to the number (five as indicated at address N in the block N004 in this case) of control points is fetched in advance, it is determined that the block is the last one of NURBS (affirmative in step S108). In this case, the information corresponding to the number of control points can be fetched at the time point when the block (X80.0, Y0.0, Z0.0, W1.0;) preceding to the block N007 is fetched, and therefore it is determined that this block is the last one of NURBS.

Upon determination of the last block of NURBS, the predetermined conversion is carried out as designated in step S102 from the NURBS information accumulated in the memory (step S109).

In the case where the conversion to a minuscule line segment interpolation command is designated as in (a), the NURBS curve is converted into minuscule line segments and thereby constitutes a predetermined data.

In the case where the conversion to a spline interpolation command is designated as in (b), the NURBS curve is converted into a set of passing points of a spline curve and thereby constitutes a predetermined data.

In the case where the conversion to another format of NURBS is designated as in (c), the NURBS format is converted and thereby constitutes a predetermined data.

The method of constructing data in each of the conversion processes will be described later.

Then, the data on the conversion result configured as described above are written in the destination file as a text data (step S110) and the process is looped back to step S103.

By repeating the aforementioned process, the blocks other than the NURBS interpolation in the source file are written directly in the destination file, while the blocks of the NURBS interpolation are written in the destination file as data converted to a minuscule line segment interpolation, a spline interpolation or other NURBS interpolation format.

Upon complete processing of all the data in the source file, it is determined that there is no data to be read (negative in step S104), and all the processes are terminated by closing the source file and the destination file (step S111).

Now, each conversion process will be explained. Conversion from NURBS to minuscule line segments:

The process of converting the NURBS curve into minuscule line segments will be explained.

In this process, a string of points is generated by taking sampling points in such a manner that the distance (chord error) d between a line segment connecting the adjacent sampling points Ps on the NURBS curve B and the NURBS curve as shown in FIGS. 4(a), (b) may not exceed a tolerable error $\epsilon$.

Figure 5:
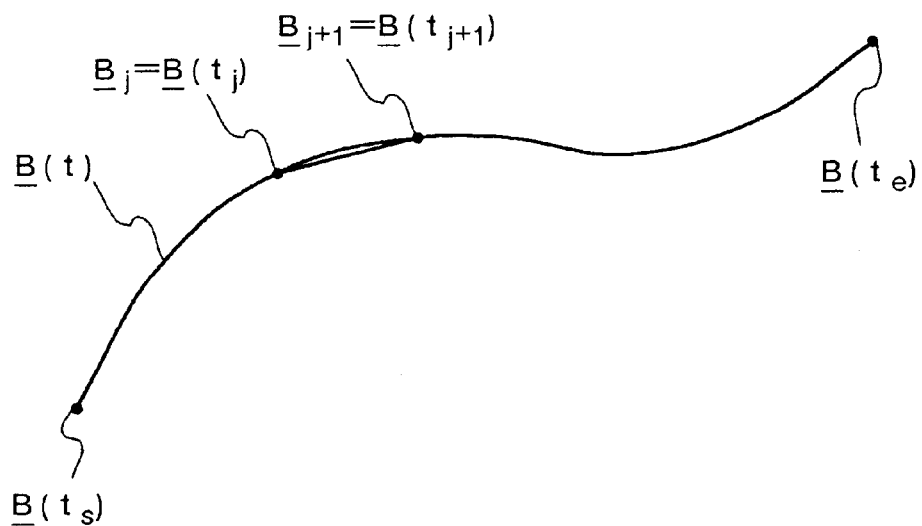
FIG. 5 is a diagram for explaining the manner in which points on the NURBS curve are presented.

Assuming that the position vector on the NURBS curve accumulated as data is B(t), B(t) in FIG. 5 is expressed by the following equation, where $t_s \leq t \leq t_e$.

In the description that follows, the symbols with an underline are assumed to be a vector and expressed in distinction from a scalar.

$$\underline{B}(t) = \frac{\sum_{i=1}^{n} N_{i,k}(t) w_i \underline{P}_i}{\sum_{i=1}^{n} N_{i,k}(t) w_i} \quad (1)$$

where n is the number of control points, $P_i$ is the position vector at a control point, $w_i$ is the weight of a control point, k is the number of steps, and t is a parameter with a definition area in a predetermined range of $t_s \leq t \leq t_e$ ($1 \leq i \leq n$).

$N_{i,k}(t)$ is the basic function of the B spline and recursively defined as follows.

$$N_{i,k}(t) = \frac{t - t_i}{t_{i+k-1} - t_i} N_{i,k-1}(t) + \frac{t_{i+k} - t}{t_{i+k} - t_{i+1}} N_{i+1,k-1}(t) \quad (2)$$

$$N_{i,1}(t) = \begin{cases} 1 & (t_i \leq t_{i+1}) \\ 0 & (\text{else}) \end{cases}$$

where $t_i$ is a knot, $[t_0\ t_1\ t_2\ \ldots\ t_m]$ is a knot vector, and the number m+1 thereof is the sum of the number n of control points and the number k of steps, i.e. (m+1)=n+k. In the case where the definition area of the NURBS curve B(t) having the number k of steps is given as $t_s \leq t \leq t_e$, the relation holds that $t_s = t_{k-1}$ and $t_e = t_{m-k}$ for the knot vector described above.

When a point $B_j$ ($=B(t_j)$) is taken on the NURBS curve B(t), the next point $B_{j+1}$ associated with a value not larger than the chord error $\epsilon$ can be taken as follows.

Figure 6:
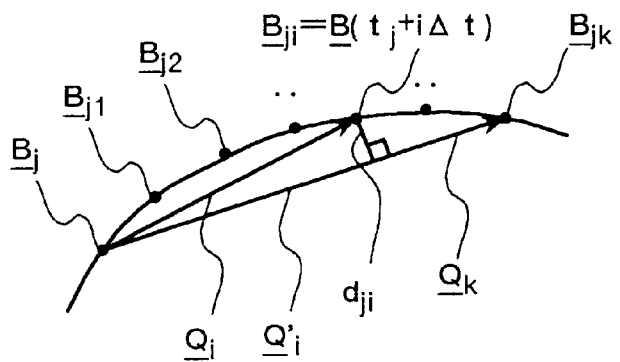
FIG. 6 is a diagram for explaining the manner of determining sampling points in the case where the chord error from the NURBS curve is within a tolerance.

As shown in FIG. 6, assuming that $\Delta t$ is a minuscule change of a parameter and that $$B_{ji} = B(t_j + i \cdot \Delta t) \quad (3)$$

then, expressing the vector from the initial point $B_j$ to $B_{ji}$ as $Q_i$ where i=1, 2, 3, . . . , k, the projective vector $Q'_i$ of $Q_i$ on $Q_k$, is given as $$Q'_i = (Q_i, Q_k)/|Q_i|^2 \cdot Q_i \quad (4)$$

and the distance $d_{ji}$ between points P and Q is given as $$d_{ji} = |Q_i - Q'_i|$$

Therefore, calculating this equation by increasing k from 1, the maximum k satisfying the relation $$d_{ji} < \epsilon \quad (0 < i < k) \quad (5)$$

is determined as $B_{j+1} = B_{jk}$.

Consequently, by determining $B_{j+1}$ sequentially starting from $B_0 = B(t_s)$ (j=0), the sampling points $B_0, B_1, \ldots, B_N$ can be determined at which the chord error with the NURBS curve is not more than $\epsilon$, where $B_N = B(t_e)$.

Figure 7:
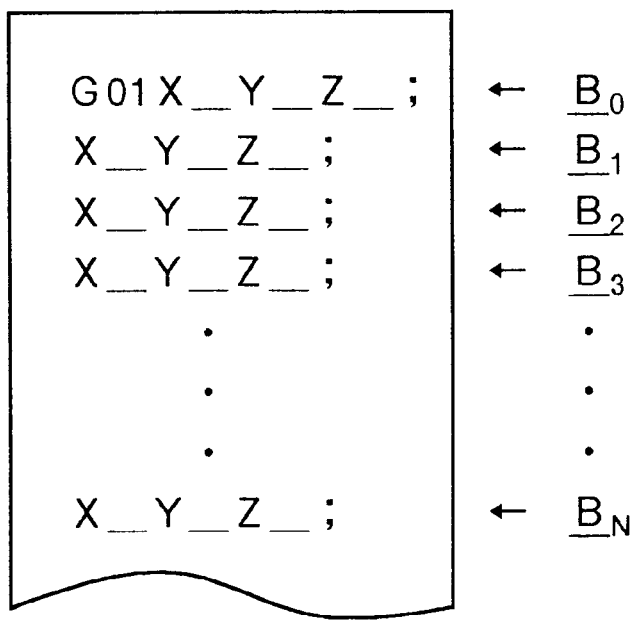
FIG. 7 is a list showing the form of the text data with the NURBS interpolation command converted into a minuscule line segment command.

FIG. 7 shows text data configured of a string of points converted in this way, and the leading G01 is a G code indicating the linear interpolation. The text data configured in this way are written in the destination file.

As described above, by use of the function of the file converter according to the invention for converting the NURBS interpolation command to a minuscule line segment interpolation command, a machining program is obtained in which the portions other than the NURBS interpolation command are not converted while the NURBS interpolation command portion is converted into a minuscule line segment command with not more than a designated chord error. Thus, it is possible to convert the machining program including the NURBS interpolation command for machining in a NC machine tool within a tolerance not supporting the NURBS interpolation.

Figure 8:
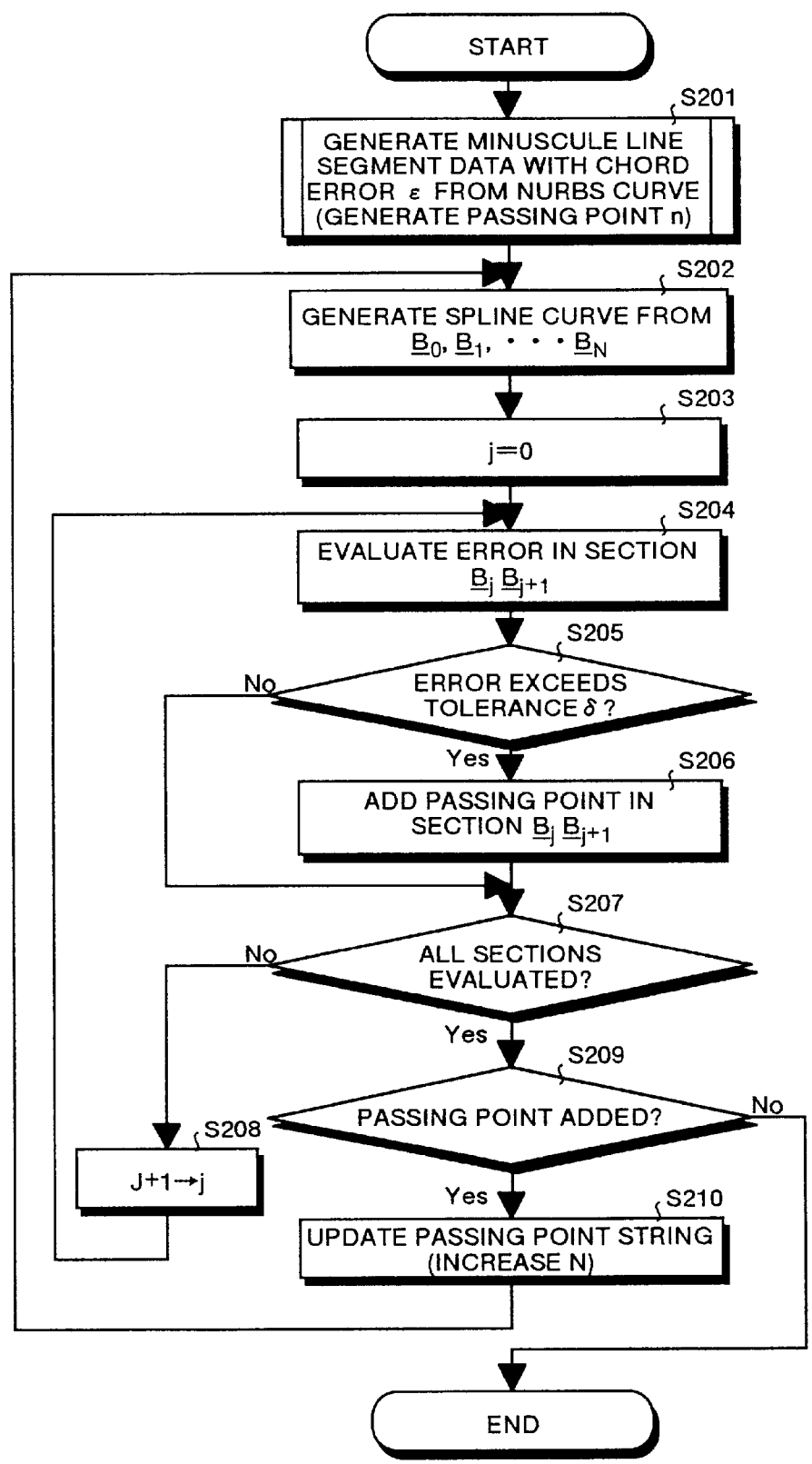
FIG. 8 is a process flowchart showing the steps of determining the passing points of a spline curve in the case where the NURBS interpolation command portion is converted into a spline interpolation command in the file conversion apparatus according to the present invention.

Conversion from NURBS to spline:

Now, the process flow for converting the NURBS curve into a string of points for a spline curve will be explained with reference to FIG. 8.

Assume that the arithmetic expression of the NURBS curve held in the computer is B(t). First, the curve B(t) is approximated to a minuscule line segment data with a tolerance $\epsilon$ by following the same process as the one mentioned above (for conversion from NURBS to minuscule line segments) (step S201).

Figure 9:
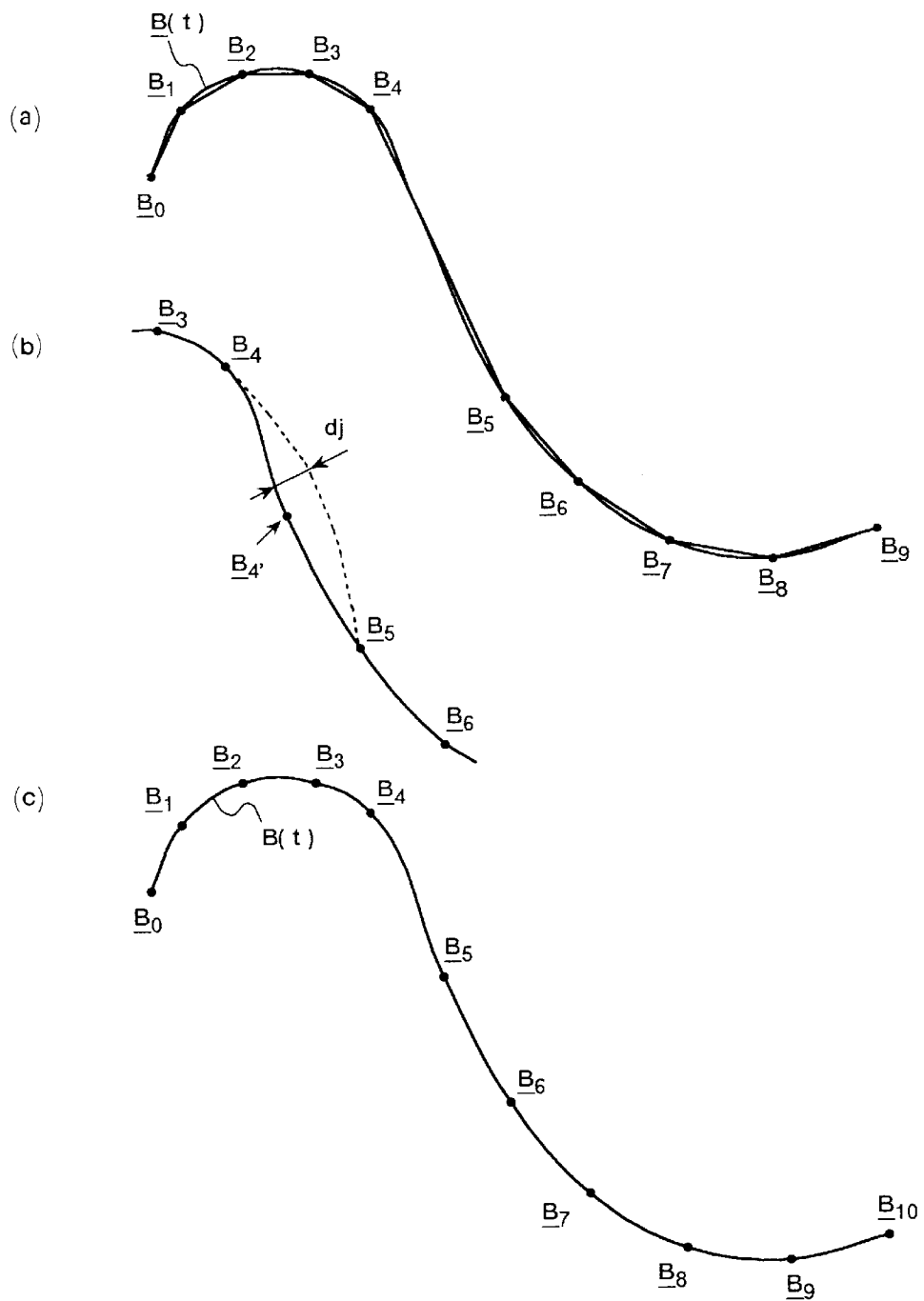
FIGS. 9(a) to (c) is a diagram for explaining the characteristic of the spline curve, FIG. 10 are diagrams for explaining the manner in which the passing points of the spline curve are designated on the NURBS curve.

In this case, as shown in FIG. 9(a), the curve B(t) is expressed by (N+1) (which is equal to 10 in this case) passing points including $B_0, B_1, \ldots, B_N$.

Then, a spline curve is generated from the (N+1) passing points (step S202).

According to the well-known curve theory (for example, "Shape Processing Engineering (I)", by Fujio Yamaguchi, published from Nikkan Kogyo Shimbun), the points P(t) on a tertiary spline curve smoothly passing through the (N+1) points $B_0, B_1, \ldots, B_N$ are expressed as $$\underline{P}(t) = [t^3\ t^2\ t\ 1] \begin{bmatrix} 2 & -2 & 1 & 1 \\ -3 & 3 & -2 & -1 \\ 0 & 0 & 1 & 0 \\ 1 & 0 & 0 & 0 \end{bmatrix} \begin{bmatrix} \underline{B}_{j-1} \\ \underline{B}_j \\ c_j \underline{q}_{j-1} \\ c_j \underline{q}_j \end{bmatrix} \quad (6)$$

Figure 10:
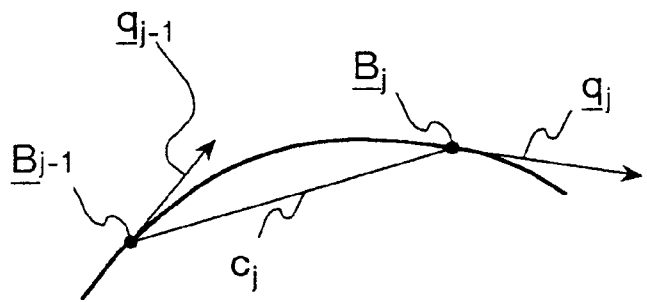

$(j = 2, 3, \ldots, n)$ in the section of $B_{j-1}$ to $B_j$ shown in FIG. 10.

In this expression, $q_j$ is a unit tangent vector at a designated point $B_j$, and $c_j$ is the distance from $B_{j-1}$ to $B_j$. Further, t is a curve parameter holding the relation $0 \leq t \leq 1$.

The spline curve in equation (6) always passes through the designated point $B_j$, where j=0, 1, 2, . . . , N. Unless $q_j$ is determined appropriately, however, the secondary differentiation fails to be continuous at each designated point. The conditions under which the secondary differentiation becomes continuous at designated points $B_j$, where j=0, 1, 2, . . . , N, are $$c_{j+1}\underline{q}_{j-1} + 2(c_{j+1}+c_j)\underline{q}_j + c_j\underline{q}_{j+1} = \tag{7}$$

$$\frac{3}{c_j c_{j+1}}(c_j^2(\underline{P}_{j+1}-\underline{P}_j)+c_{j+1}^2(\underline{P}_j-\underline{P}_{j-1}))$$

$(j=1, 2, \ldots, N)$

As for the two end points $B_0$ and $B_N$, the following conditions are added assuming that the curvature at the end points is 0.

$$2c_1 q_0 + c_1 q_1 = 3(B_1 - B_0) \tag{8a}$$

$$c_N q_{N-1} + 2c_N q_N = 3(B_N - B_{N-1}) \tag{8b}$$

By solving the (N+1) simultaneous equations (7), (8a) and (8b) and determining the tangent vector $q_j$, the tertiary spline curves for all the sections can be determined.

Specifically, in the sections $B_j$ to $B_{j+1}$, assume that the starting point $P_s$ is $B_j$, the end point $P_e$ is $B_{j+1}$, the unit tangent vector $q_s$ at the starting point is $q_j$, the tangent vector $q_e$ at the ending point is $q_{j+1}$, and the length c of the line segment is $c_{j+1}$, and also assume that $$K_0 = P_s \tag{9a}$$

$$K_1 = c\, q_s \tag{9b}$$

$$K_2 = 3(P_e - P_s) - 2cq_s - cq_e \tag{9c}$$

$$K_3 = 2(P_s - P_e) - cq_s - cq_e \tag{9d}$$

Then, the spline curve P(t) in the section $P_j$ to $P_{j+1}$, is given as $$P(t) = K_3 t^3 + K_2 t^2 + K_1 t + K_0 \tag{10}$$

Then, j=0 is initialized (step S203) to evaluate the error in each section of the spline curve (step S204).

Figure 11:
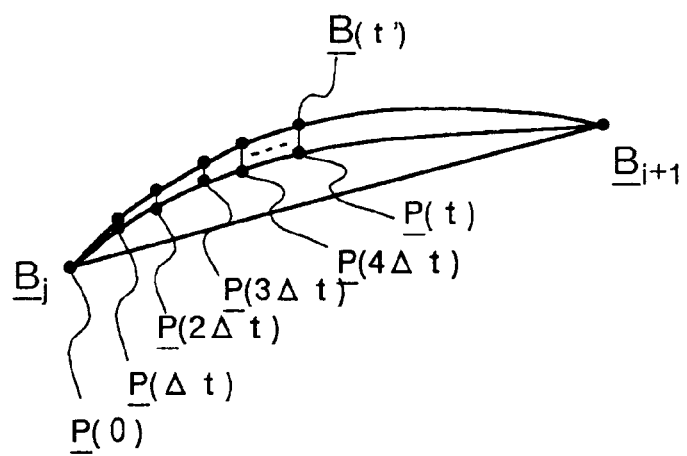
FIG. 11 is a diagram for explaining a method for determining the maximum error between the spline curve and the NURBS curve.

In a method of calculating the error, the maximum distance between each point P(t) on the curve P(t) given in equation (10) and the line segment $B_j$–$B_{j+1}$ while inching the parameter t by $\Delta t$ each time, and the resulting value is assumed to be an error $d_j$ (FIG. 11).

The point B(t') on the original NURBS curve corresponding to the point P(t) on the spline curve can be determined in the following manner.

From equation (10), $P(t)=K_3 t^3 + K_2 t^2 + K_1 t + K_0$ ($0 \leq t \leq 1$), and therefore the tangent vector v at point P(t) can be easily determined from $$dP(t)/dt = 3K_3 t^2 + 2K_2 t + K_1 \tag{11}$$

Assume that the parameters of the NURBS curve B(t) representing the starting point P(0) and the ending point P(1) of the spline curve in this section are $t_s$ and $t_e$, respectively. The initial value on the NURBS curve B(t) corresponding to the point P(t) ($0 \leq t \leq 1$) is given as B(t') (t'=$t_s$+t·($t_e$–$t_s$)) (FIG. 12(a)).

Then, the vector r directed from point P(t) toward B(t') is taken and the inner product (r, v) of r and the tangent vector v is determined.

Assuming that the angle formed between the vector r and the tangent vector v is $\theta$ and studying the sign of the inner product, it is seen that when (r, v)>0, $\theta$<90°, when (r, v)=0, $\theta$=90°, and when (r, v)<0, $\theta$>90°.

Accordingly, when (r, v)>0, t'–dt' is updated to t', and when (r, v)<0, t'+dt' is updated to t'. Thus, determining B(t') and the vector r, the inner product (r, v) is determined. This process is repeated.

In this process, dt' is a minuscule increment of the parameter of the NURBS curve B(t), and with the increase in t', the angle $\theta$ decreases, while with the decrease in t', the angle $\theta$ increases (FIG. 12(b)). In the case where each time the sign of the inner product (r, v) is inverted, dt' is reduced by one half, therefore, the vector r approaches the tangent vector v from the direction perpendicular thereto each time of the repetitive process.

Thus, by interrupting the repetitive process with the desired accuracy, the point B(t') on the NURBS curve corresponding to the point P(t) can be obtained (FIG. 12(c)).

The next process is to evaluate whether the error $d_j$ has exceeded the tolerable error $\delta$ or not (step S205). In the case when $d_j > \delta$ (affirmative in step S205), the error is assumed to have exceeded the tolerance and one passing point is added on the curve within the section $B_j$ to $B_{j+1}$ (step S206).

A new passing point can be determined in the following manner. Assume that the parameters representing the points $B_j$, $B_{j+1}$ on the original NURBS curve B(t) are $t_j$, $t_{j+1}$. The parameter t' is given as t'=$t_j$+($t_{j-1}$–$t_j$)/2, a new passing point $B_j'$=B(t') is determined. As an alternative, the parameter t' can be determined by the convergent calculation in such a manner that $B_j B_j' = B_j' B_{j+1}'$.

In the example shown in FIG. 9(b), a trace is plotted in which the spline curve deviates considerably from the original curve B(t) in the section $B_4$ to $B_5$. The error $d_j$ increased to such an extent that $d_5 > \epsilon$. As a result, a new passing point $B_4'$ was added.

When $d_j \leq \delta$ (negative in step S205), on the other hand, step S206 is skipped.

Then, it is checked whether all the sections have been evaluated (step S207), and if j<(N–1) (negative in step S207), j+1 is updated to j (step S208), and the error in the next section is evaluated in step S204 and subsequent steps.

Upon complete evaluation in the sections of all the steps (affirmative in step S207), it is checked whether a new passing point is added or not (step S209), and if a passing point is added (affirmative in step S209), the passing points are added to generate a new string of passing points (step S210). In the process, the number N+1 of points is increased by the number of added passing points.

In the case under consideration, the passing point $B_4'$ is added to generate new point string $B_0, B_1, \ldots, B_{10}$. The points $B_5, B_6, \ldots, B_{10}$ in FIG. 9(c) correspond to the original points $B_4'$ (FIG. 9(b)), $B_5, \ldots, B_9$ (FIG. 9(a)).

Then the process returns to step S202 and the spline curve is regenerated by the updated passing point string. Thus, the error evaluation of the newly generated spline curve is repeated in step 204 and subsequent steps.

Once the error between the spline curve generated by the passing point string and the original curve is reduced sufficiently through this process, new passing points are not required to be added, thereby terminating the process of step S209.

Figure 13:
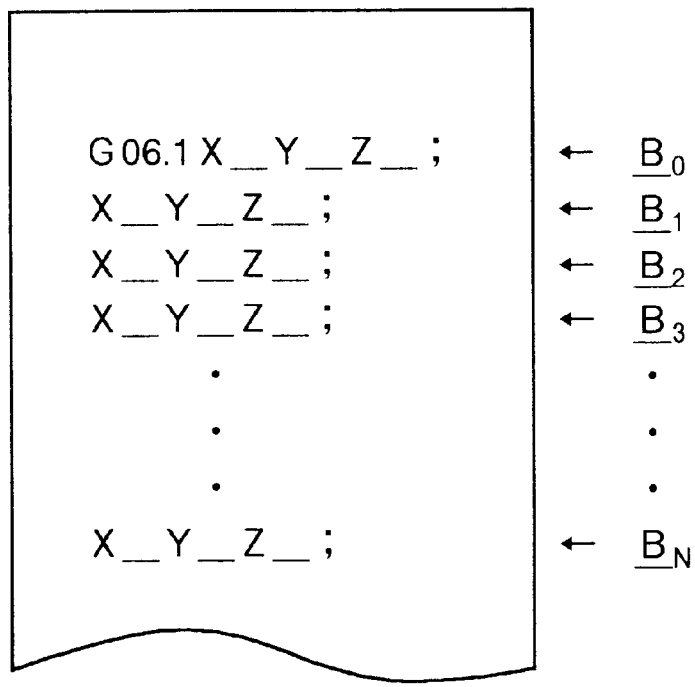
FIG. 13 is a list showing the form of the text data in the case where the NURBS interpolation command portion is converted into a spline curve interpolation command.

FIG. 13 shows text data configured of the point string converted this way. The leading G06.1 is the G code indicating the spline interpolation, and this text data is written in the destination file.

As described above, by use of the function of the file converter according to the present invention to convert the NURBS interpolation command to the spline interpolation command, a machining program is obtained in which the portions other than the NURBS interpolation command are left as they are while the NURBS interpolation command portion is converted into a spline interpolation command within a designated error. It is thus possible to convert a machining program including the NURBS interpolation command for use in a NC machine tool supporting the spline interpolation. In addition, the desired error is guaranteed between the trace machined by the spline interpolation and the trace to be machined by the original NURBS interpolation.

Conversion from NURBS to NURBS:

In this example, an explanation will be given of the case in which the NURBS interpolation command having a format as shown in FIG. 14 is converted into a NURBS interpolation command having a format as shown in FIG. 15.

In the case where the source file illustrated in FIG. 14 is read, the NURBS information accumulated internally at the time point when it is determined that a given block is the last one of NURBS is expressed as Number of steps M=4

Number of control points N=5

Knot vector (10 points)

$t$=[0.0, 0.0, 1.0, 1.0, 2.0, 3.0, 4.0, 5.0, 6.0, 6.0]

X, Y, Z coordinates and weight at five control points.

In the NURBS curve, upon determination of each control point and the number of knot vectors which is equal to the sum of the number of control points, the number of steps and 1, NURBS can be uniquely defined. It is therefore easy to develop these information into a predetermined NURBS format.

Figure 16:
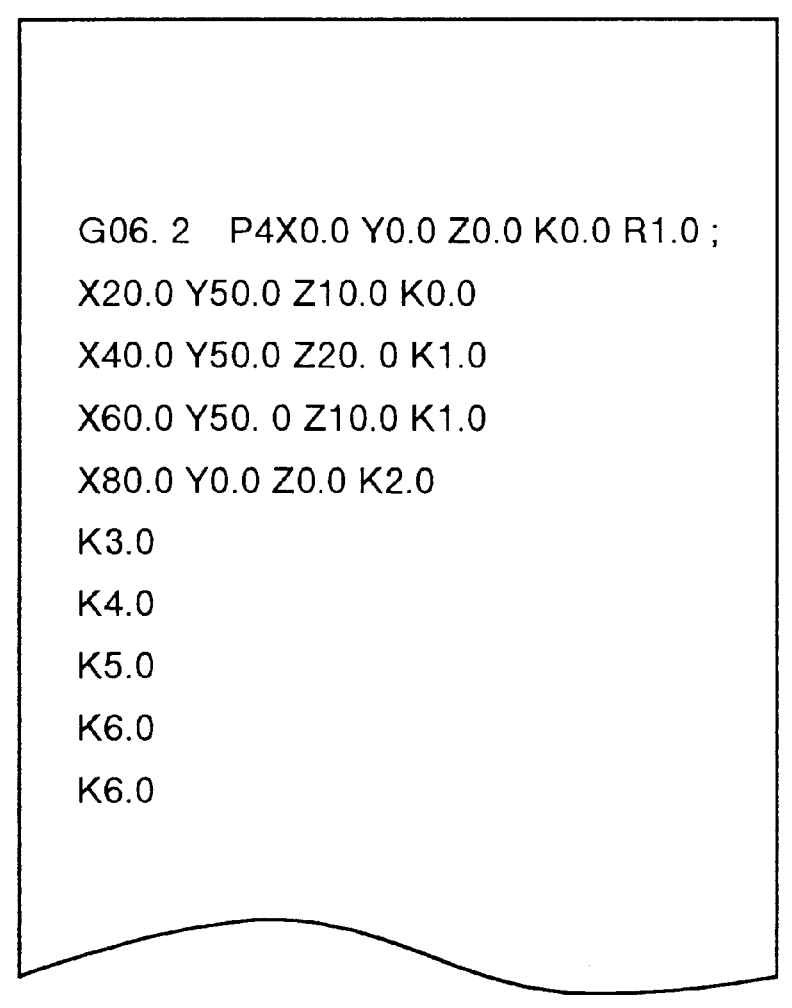

In the case where the NURBS format of the destination is designated as the format as shown in FIG. 15, the text data as shown in FIG. 16 is developed and written in the destination file.

As described above, by use of the format of the NURBS interpolation command of the file converter according to the present invention, the machining program generated in accordance with the NURBS format of a given company can be easily converted into the NURBS format for use in the NC machine tool of another company.

INDUSTRIAL APPLICABILITY

A file conversion apparatus for a machining program for a numerical control system and a computer readable recording medium storing a program for causing the computer to execute the file conversion process according to the present invention are suitable as a file converter to produce a machining program of various NC machine tools.

What is claimed is:

1. A file conversion apparatus operating on a computer to convert a source file into a destination file for a machining program for a numerical control system comprising:

a conversion unit that receives a machining program for said numerical control system, including a NURBS interpolation command, as a source file, and leaves portions other than the NURBS interpolation command portion as they are and converts the NURBS interpolation command into a minuscule line segment interpolation command while analyzing the input machining program sequentially, wherein, the destination file is generated by leaving the portions other than the NURBS interpolation command portion as they are and converting the NURBS interpolation command into a minuscule line segment interpolation command.

2. A file conversion apparatus operating on a computer to convert a source file into a destination file for a machining program for a numerical control system comprising:

a conversion unit that receives a machining program for said numerical control system, including a NURBS interpolation command as a source file, and leaves portions other than the NURBS interpolation command portion as they are and converts the NURBS interpolation command into a spline interpolation command while analyzing the input machining program sequentially, wherein, the destination file is generated by leaving portions other than the NURBS interpolation command as they are and converting the NURBS interpolation command into a spline interpolation command.

3. The file conversion apparatus for a machining program for a numerical control system, according to claim 2, wherein in the conversion from a NURBS interpolation command to a spline interpolation command, a string of points is generated by polygonal approximation in such a manner that chord error from a NURBS curve is not more than a tolerance, after which a spline curve passing through said point string is generated, the error between the line segment in each section between the passing points and the spline curve is evaluated in order to check whether the error is more than the tolerance or not, a passing point is added in the corresponding section to reconstruct the point string if the error exceeds the tolerance, and the point string thus reconstructed is used as a string of passing points for the spline interpolation command.

4. The file conversion apparatus for a machining program for a numerical control system, according to claim 3, wherein when a passing point is added while constructing a string of passing points of a spline curve from a NURBS curve, a spline curve passing through the point string is generated again from the reconstructed point string, the error between the line segment in each section between the passing points and the spline curve is evaluated in order to check whether the error is more than a tolerance or not, and a passing point is added in the corresponding section thereby to reconstruct the point string if the error exceeds said tolerance, the reconstruction process being repeated until there are no new passing points to be added.

5. A file conversion apparatus operating on a computer to convert a source file into a destination file for a machining program for a numerical control system, said apparatus comprising:

a conversion unit that receives a machining program for said numerical control system, including a NURBS interpolation command as a source file, and leaves portions other than the NURBS interpolation command portion as they are and converts the NURBS interpolation command into a NURBS interpolation command of a differently presented specification while analyzing the input machining program sequentially, wherein, the destination file is generated by leaving portions other than the NURBS interpolation command portion as they are and converting the NURBS interpolation command into a NURBS interpolation command of a differently presented specification.

6. A file conversion apparatus operating on a computer to convert a source file into a destination file for a machining program for a numerical control system comprising:

a conversion unit that receives a machining program for said numerical control system, including a NURBS interpolation command as a source file, and leaves portions other than the NURBS interpolation command portion as they are and converts the NURBS interpolation command portion into a minuscule line segment interpolation command while analyzing the input machining program sequentially;

a conversion unit for leaving portions other than the NURBS interpolation command portion as they are and converting the NURBS interpolation command into a spline interpolation command;

a conversion unit for leaving portions other than NURBS interpolation command portion as they are and converting the NURBS interpolation command into a NURBS interpolation command of a differently presented specification; and a conversion mode setting unit for selectively setting any one of said three conversion unit, wherein the destination file is generated by leaving portions other than the NURBS interpolation command portion as they are and converting the NURBS interpolation command portion into a minuscule line segment interpolation command, a spline interpolation command or a NURBS interpolation command of a differently presented specification in accordance with the conversion mode selectively set by said conversion mode setting unit.

7. A computer readable recording medium having stored therein a program for the computer to execute, said program including directions for:

inputting a machining program for a numerical control system including a NURBS interpolation command as a source file;

leaving portions other than the NURBS interpolation command portion as they are and converting the NURBS interpolation command into a minuscule line segment interpolation command while sequentially analyzing the input machining program; and writing in the destination file the data obtained by leaving portions other than the NURBS interpolation command portion as they are and converting the NURBS interpolation command into a minuscule line segment interpolation command.

8. A computer readable recording medium having stored therein a program for the computer to execute, said program including directions for:

inputting a machining program for a numerical control system including a NURBS interpolation command as a source file;

leaving portions other than the NURBS interpolation command portion as they are and converting the NURBS interpolation command into a spline interpolation command while sequentially analyzing the input machining program; and writing in a destination file the data obtained by leaving portions other than the NURBS interpolation command portion as they are and converting the NURBS interpolation command into a spline interpolation command.

9. The computer readable recording medium according to claim 8, having stored therein a program for the computer to execute:

converting a NURBS interpolation command into a spline interpolation command, including;

generating a string of points with the help of polygonal approximation in such a manner that the chord error from the NURBS curve is not more than a tolerance;

generating a spline curve passing through said point string;

evaluating the error between the line segment in each section between the passing points to check whether the error is more than the tolerance or not;

reconstructing the point string by adding at least a passing point in the corresponding section if the error is more than the tolerance, and determining the reconstructed point string as a string of passing points for the spline interpolation command.

10. The computer readable recording medium according to claim 9, having stored therein a program for the computer to execute:

the process of constructing a string of passing points of a spline curve from a NURBS curve, wherein in the case where at least a passing point is added, a spline curve passing through the point string is generated again from a reconstructed point string, the error between the line segment in each section between the passing points and a tertiary spline curve is evaluated in order to check whether the error is more than a tolerance or not, and if the error exceeds the tolerance then a passing point is added in the corresponding section thereby to reconstruct a point string, this process being repeated until there is no new passing points to be added.

11. A computer readable recording medium having stored therein a program for the computer to execute, said program including directions for:

inputting a machining program for a numerical control system, including a NURBS interpolation command as a source file;

leaving portions other than the NURBS interpolation command portion as they are and converting the NURBS interpolation command into a spline interpolation command while sequentially analyzing the input machining program;

leaving portions other than the NURBS interpolation command portion as they are and converting the NURBS interpolation command into a NURBS interpolation command of a differently presented specification; and writing in a destination file the data obtained by leaving portions other than the NURBS interpolation command portion as they are and converting the NURBS interpolation command into a NURBS interpolation command of a differently presented specification.

12. A computer readable recording medium having stored therein a program for the computer to execute, said program including directions for:

inputting a machining program for a numerical control system, including a NURBS interpolation command as a source file;

leaving portions other than the NURBS interpolation command portion as they are and converting the NURBS interpolation command into a minuscule line segment interpolation command while sequentially analyzing the input machining program;

leaving portions other than the NURBS interpolation command portion as they are and converting the NURBS interpolation command into a spline interpolation command;

leaving portions other than the NURBS interpolation command portion as they are and converting the NURBS interpolation command into a NURBS interpolation command of a differently presented specification;

a conversion mode setting step of selectively setting any one of said three conversion steps; and writing in the destination file the data obtained by leaving portions other than the NURBS interpolation command portion as they are and converting the NURBS interpolation command into a minuscule line segment interpolation command, a spline interpolation command or a NURBS interpolation command of a differently presented specification, in accordance with the conversion mode selected in said conversion mode.

* * * * *

UNITED STATES PATENT AND TRADEMARK OFFICE
CERTIFICATE OF CORRECTION

PATENT NO. : 6,609,045 B1  Page 1 of 1
DATED : August 19, 2003
INVENTOR(S) : Daisuke Fujino It is certified that error appears in the above-identified patent and that said Letters Patent is hereby corrected as shown below:

<u>Title page,</u>
Item [22], PCT Filed, delete "Jan. 28, 1999" and insert -- May 28, 1998 --

Signed and Sealed this

Twentieth Day of January, 2004

JON W. DUDAS
*Acting Director of the United States Patent and Trademark Office*